United States Patent
Hackmann (10) Patent No.: US 7,591,336 B2
(45) Date of Patent: Sep. 22, 2009

(54) PIN DISENGAGING ASSEMBLY AND A METHOD OF DISENGAGING PINS OF A TRAILER TANDEM

(76) Inventor: Paul Hackmann, 2412 Kelling Dr., Millstadt, IL (US) 62260

( * ) Notice: Subject to any disclaimer, the term of this patent is extended or adjusted under 35 U.S.C. 154(b) by 187 days.

(21) Appl. No.: 11/627,226

(22) Filed: Jan. 25, 2007

(65) Prior Publication Data

US 2008/0079234 A1  Apr. 3, 2008

Related U.S. Application Data

(60) Provisional application No. 60/847,730, filed on Sep. 28, 2006.

(51) Int. Cl.
*B62D 53/06* (2006.01)
(52) U.S. Cl. .................. 180/209; 280/149.2; 280/407.1
(58) Field of Classification Search ................ 280/80.1, 280/149.1, 149.2, 407.1; 294/19.1; 180/21, 180/209
See application file for complete search history.

(56) References Cited

U.S. PATENT DOCUMENTS

| | | | |
|---|---|---|---|
| 3,372,946 A * | 3/1968 | Hutchens | 280/81.1 |
| 3,618,969 A | 11/1971 | Glassmeyer | |
| 3,778,079 A * | 12/1973 | Vornberger et al. | 280/149.2 |
| D289,360 S | 4/1987 | Westcott | |
| 4,838,566 A * | 6/1989 | Baxter et al. | 280/149.2 |
| 4,838,578 A * | 6/1989 | Baxter | 280/149.2 |
| 5,037,123 A * | 8/1991 | Smith | 280/508 |
| 5,326,144 A | 7/1994 | Forcier | |
| 5,449,190 A | 9/1995 | Ford | |
| 5,480,171 A * | 1/1996 | Cheffey | 280/149.2 |
| 5,507,511 A * | 4/1996 | Schueman | 280/149.2 |
| 5,531,467 A * | 7/1996 | Schueman | 280/149.2 |
| 5,564,725 A | 10/1996 | Brazeal | |
| 5,617,072 A | 4/1997 | McNeal | |
| 5,678,834 A | 10/1997 | Wise | |
| 5,833,253 A | 11/1998 | Hess | |
| 6,279,932 B1 | 8/2001 | White et al. | |
| 6,354,642 B1 | 3/2002 | Haggerty | |
| 6,935,664 B2 | 8/2005 | McGrew et al. | |
| 6,951,332 B2 | 10/2005 | Zimmerman | |
| 7,325,822 B1* | 2/2008 | Humphreys et al. | 280/149.2 |
| 2003/0201651 A1 | 10/2003 | Lockhart | |
| 2003/0214111 A1* | 11/2003 | Browning | 280/149.2 |
| 2005/0093314 A1 | 5/2005 | McGrew et al. | |
| 2005/0104316 A1* | 5/2005 | Pappas | 280/149.2 |
| 2005/0223848 A1 | 10/2005 | Ueno et al. | |
| 2007/0017715 A1* | 1/2007 | McCann | 180/24.02 |
| 2007/0187923 A1* | 8/2007 | McNeal et al. | 280/407.1 |

* cited by examiner

*Primary Examiner*—Ruth Ilan
*Assistant Examiner*—James English
(74) *Attorney, Agent, or Firm*—Polster Lieder Woodruff & Lucchesi, L.C.

(57) ABSTRACT

A disengagement assembly for maintaining a disengaging force on a tandem assembly. The disengagement assembly operates with an actuating arm of a retractable pin assembly of a tandem wherein the actuating arm reciprocates between an engaged position and a disengaged position. The disengagement assembly maintains an applied force on the actuating arm in the disengaged position so that the tandem remains in a movable relationship with respect to frame members of a trailer.

14 Claims, 6 Drawing Sheets

PIN DISENGAGING ASSEMBLY AND A METHOD OF DISENGAGING PINS OF A TRAILER TANDEM

CROSS-REFERENCE TO RELATED APPLICATIONS

This application claims priority under 35 U.S.C. § 119(e) to U.S. Provisional Patent Application No. 60/847,730 filed Sep. 28, 2006, in the name of the present inventor and entitled "Truck Tandem Tool" and is incorporated herein by reference.

STATEMENT REGARDING FEDERALLY SPONSORED RESEARCH

Not Applicable.

BACKGROUND OF THE DISCLOSURE

The present disclosure relates to an assembly that disengages a pin assembly of a tandem, and in particular, to an assembly that attaches to the tandem and maintains the tandem in a disengaged position from a truck trailer while the truck trailer undergoes positioning over the tandem for load adjustments.

In the trucking and heavy equipment industry, particularly in the tractor-trailer vehicle industry, loads of various sizes and weights must be handled. While handling these loads, trailer operators/drivers must comply with specific laws governing the permissible weight of trailers that travel on freeways and highways. Typically, the laws specify the maximum allowable weight per tandem of the trailer.

In most tractor-trailer vehicles, the trailers connect with the tandem, so called because this unit usually contains two axles and associated wheels. The tandem also contains the suspension system and brakes for the trailer. These tandems can be moved longitudinally along the length of the trailer to provide stability when loading and/or to distribute the weight of the load during transport. The tandem mounts on an underside of a trailer chassis, and is movable longitudinally there along to provide a means of variable load distribution. As noted, the amount of cargo that a trailer carries is governed by local, state and/or national road and bridge laws, and is dependent on proper load distribution. Proper placement of the tandem varies individual axle loads or redistributes the trailer load so that the trailer load is within legal limits.

Once the operator properly positions the tandem for the load, a retractable pin assembly connects the tandem to the trailer chassis. This retractable pin assembly generally includes two or more, and typically four, retractable pins that may be operated by a lever mechanism. When the pins are in their extended position, the pins extend through a corresponding opening formed in the tandem and selectively engage one of a plurality of openings formed in the trailer chassis. The pins, in the engaged position, lock the tandem in a selected position relative to the trailer chassis. To disengage the pins, the operator pulls a handle of the lever mechanism, known as a "pull rod", wherein the pull rod pivots the pins out of the openings of the trailer chassis so that the tandem disengages from the trailer.

Operators of tractor-trailer trailers must frequently change the position of the tandem axles relative to the trailer to comply with the particular trailer weight laws. Several changes may be required during a single trip where the load is sequentially reduced. When the operator wants to change the positioning of the tandems, the operator performs a series of steps. With the trailer held in position by chocks or brakes, the operator manipulates the pull rod to pull the pins out of their corresponding openings. The operator then stabilizes the tandem and enters the cab to move the trailer to the required position over the tandem.

During these movements, the operator enters the cab and inches the trailer forward or backward while maintaining the tandem axles in the same place. The operator, while in the cab, guesses as to how much movement of the trailer will result in the desired amount of relative trailer movement for proper load distribution. After making an initial guess, the operator exits the cab to observe the actual amount of trailer movement, and then reenters the cab to make further adjustments. These adjustments are known as "bumping" the trailer. Once the operator achieves the desired position, the pins must be reseated into the trailer. This reseating requires that the operator move the pull rod so that the pins move back into the engaged position, following which the operator again gets into the cab and slowly moves the trailer until the pins slide into their corresponding openings and once again lock the trailer and tandem together. Finally, the operator normally walks back to check that all pins are securely in place.

During trailer movement, however, the pins may become jammed due to corrosion, age, rust and worn parts and will bind the pins in the engaged position. The trailer must be moved slightly or rocked back and forth to center the pins in the specific openings. This position must be found by the operator by trial and error, with each attempt necessitating trips from near the back of the trailer to the cab. With use of longer trailers, combined with the fact that the operator may be doing this in extreme weather conditions, adds to the potential for this trailer movement being a very frustrating, time-consuming and dangerous task.

Since the pull rod must be maintained in the disengaged position during the trailer movement, the operator must make numerous trips in and out of the cab to repeatedly pull the pull rod to disengage any jammed pins. When the operator pulls the pull rod, enough force must be applied to overcome spring loading of a return spring, and to hold the pins in an unlocked position. Typically, the operator grasps the handle and yanks the pull rod toward the operator's shoulders. Thus, when the pins become jammed, the operator of the trailer risks personal injury due to overexertion in attempting to manually free jammed pins.

A typical method of attempting to release jammed pin mechanisms involves the operator to rock the trailer fore and aft, while an assistant manually operates the retractable pin assembly via the pull rod. The rocking motion briefly realigns the misaligned openings, so that the assistant can retract the pins during the period of realignment. The assistant's position next to the moving trailer, however, leads to an injury risk since the assistant is concentrating on handling the pull rod and is not concentrating on the moving trailer.

Various release tools assist in pulling the pins in the disengaged position, wherein these tools generally allow the trailer operator to maneuver the trailer while the release tools frees the jammed pins, thus effectively obviating the need for another person to manually operate the release mechanism. During use, one end of the typical release tool attaches to the trailer itself, which will be moving in relation to the pull rod to which the other end of the tool is attached. If a large adjustment of the trailer over the tandem is to be made, the operator must repeatedly walk back to the tandem and disconnect the tool from the trailer. The operator needs to disconnect the tool from the trailer during large adjustments, as the length of the trailer movement will break the tool if the tool remains connected to the trailer. Once the trailer position is adjusted, the operator makes another trip back to the tandem to release the pull rod.

Additionally, the current release tools are portable assemblies requiring that the operator: assemble the tool, attach the respective tool ends to the pull rod and to the trailer and disassemble the tool for storage. These multiple steps results in labor inefficiencies. Given these problems, a tandem assembly to help the operators in adjusting loads is desirable. The assembly needs to be attached to the tandem while remaining free from contact with the trailer. Further, the assembly needs to be attached to the tandem such that after initial set up, the assembly can be repeatedly used without disassembly from the tandem. In other words, the assembly remains on the tandem as the operator drives the trailer to its destination. Additionally, the assembly must be adjustable for different types of trailers with a minimum amount of trouble, while being adaptable for older trailers where the pull rod may be bent out of shape due to improper handling.

BRIEF SUMMARY OF THE DISCLOSURE

Briefly stated, the present disclosure relates to an assembly that attaches to the tandem and disengages a pin assembly while the truck trailer undergoes positioning for load adjustments.

The disengagement assembly operates with an actuating arm of a retractable pin assembly of a tandem wherein the actuating arm reciprocates between an engaged position and a disengaged position by force applied by the operator. The disengagement assembly maintains an applied force on the actuating arm in the disengaged position so that the tandem remains in a movable relationship with respect to frame members of the trailer.

The disengagement assembly comprises a pull member, a plate member and a linkage member. The pull member connects with the actuating arm of the retractable pin assembly while the plate member attaches to an outside surface of one of the frame members of the trailer. The plate member has a first opening that is correspondingly aligned with an opening of an outside wall of one of the trailer frame members. The linkage member has a first end and a second end, wherein the first end is operatively connected to the pull member and the second end is adjustably connected to the first opening of the plate member. The adjustable connections of the second end of the linkage member maintain the force on the actuating arm. This applied force keeps the pins in the disengaged position while the trailer undergoes position adjustment.

The foregoing and other objects, features, and advantages of the disclosure as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

Figure 1:
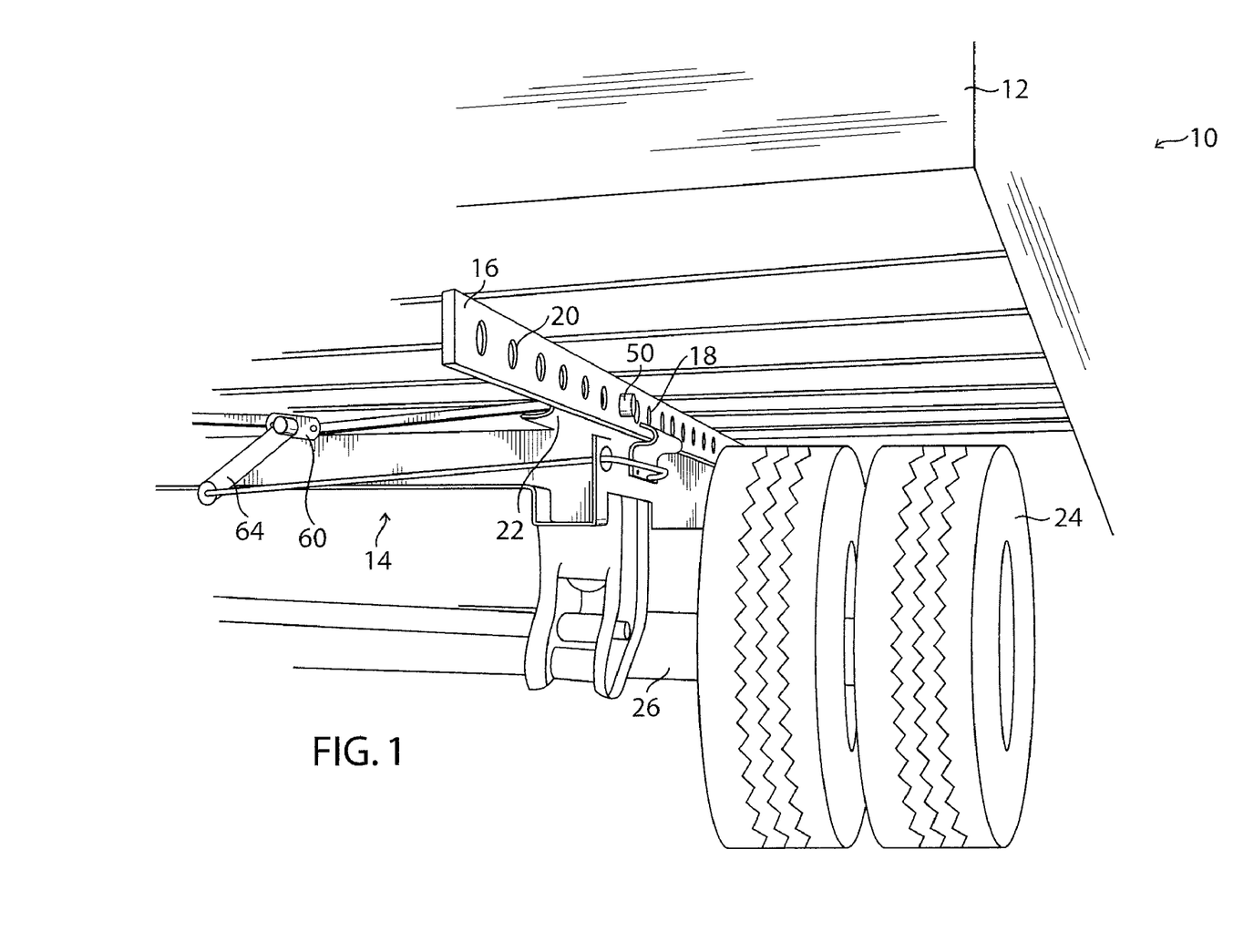
FIG. 1 is a perspective view of a trailer connected to a tandem showing a trailer chassis of the trailer engaged with pins of the tandem.

Referring to the drawings, there is shown a perspective view of a portion of a trailer generally shown as 10 supporting a cargo container 12 and there is shown a tandem assembly generally shown as 14 supporting the trailer 10 (FIG. 1). The trailer 10 includes a chassis 16 comprising a pair of longitudinally extending frame members 18 fixed to the bottom of the chassis 16 at the left and right sides thereof. The frame members 18 include a series of longitudinally spaced trailer openings 20 formed therein.

The chassis 16 is supported by the tandem assembly 14 that includes a tandem sub-frame 22, which in turn supports a portion of the chassis 16 for relative longitudinal sliding motion with respect to the chassis 16 to vary the longitudinal position of load distribution of the cargo container 12. As shown, the sub-frame 22 includes tandem wheels 24 rotatably mounted on axle 26.

Figures 2, 2A:
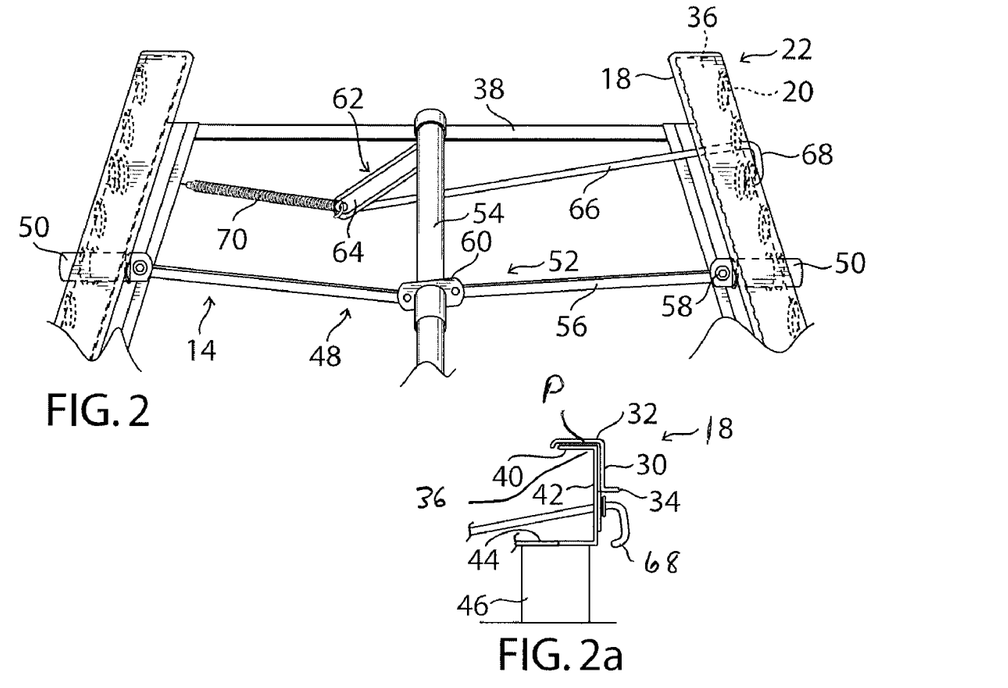
FIG. 2 is a partial perspective view of the tandem, the truck trailer and a retractable pin assembly that connects together the tandem and truck trailer wherein the retractable pin assembly is shown in an engaged position.
FIG. 2a is a partial cross sectional view of portions of the tandem and truck trailer of FIG. 2.
Figure 3:
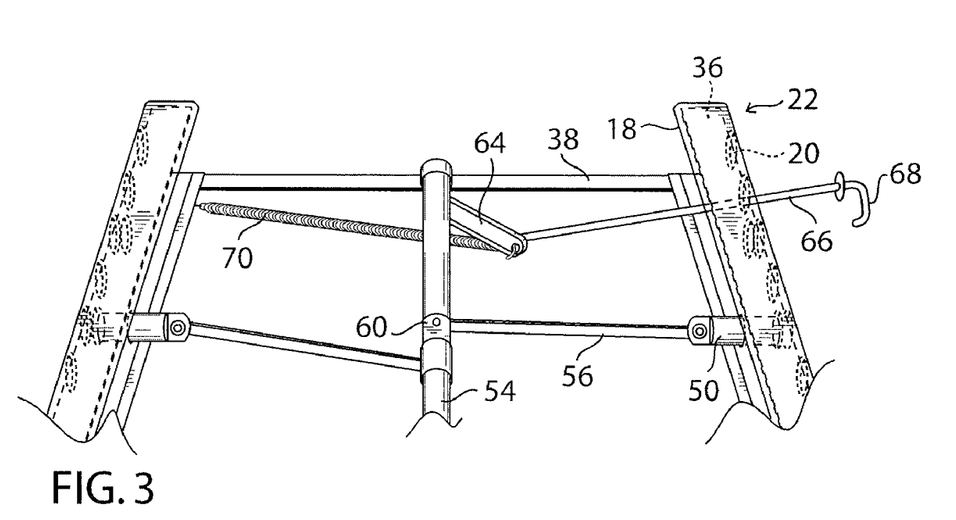
FIG. 3 is a partial perspective view of the tandem, the truck trailer and the retractable pin assembly of FIG. 1 shown in a disengaged position.

Referring to FIGS. 2-3, each frame member 18 is generally channel-shaped in the form of a flange (FIG. 2a). The frame member 18 has a generally vertical portion 30, an upper horizontal portion 32 and a lower portion 34. The tandem sub-frame 22 is of generally rectangular configuration and includes left and right slide members 36 respectively and tandem cross beams 38 interconnecting the slide members 36 as known in the art. As shown in FIG. 2, slide members 36 are slidable longitudinally within the frame members 18 of the chassis 16. In the illustrated embodiment shown in FIG. 2a, each slide member 36 has a tandem upper horizontal portion 40 spaced below the upper horizontal portion 32 of the frame member 18, a generally vertical side wall 42 disposed inwardly of vertical portion 30 of the frame member 18 and a tandem lower portion 44 positioned on top of supports 46 of the tandem assembly 14. A plurality of hooked-shaped members (not shown) may be affixed to the vertical portions 30 of the frame members 18 so as to overlie the lower portions of corresponding slide members 36 to permit the sub-frame 22, carrying the suspension, to be slidably adjustable relative to the frame members 18. Additionally, a pad "P" may be disposed between the horizontal portion 32 of the frame member 18 and the tandem horizontal portion 40 to ensure a low friction, close sliding fit between the slide members 36 and the frame members 18.

Figure 6:
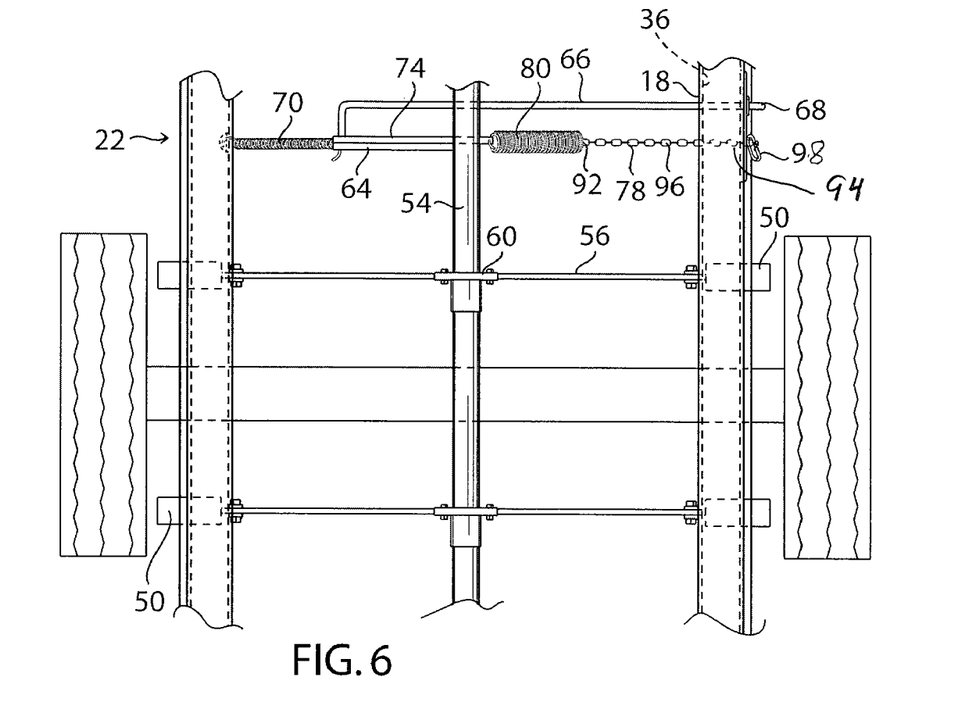
FIG. 6 is a plan view of the tandem assembly of FIG. 4 shown in the engaged position.
Figure 7:
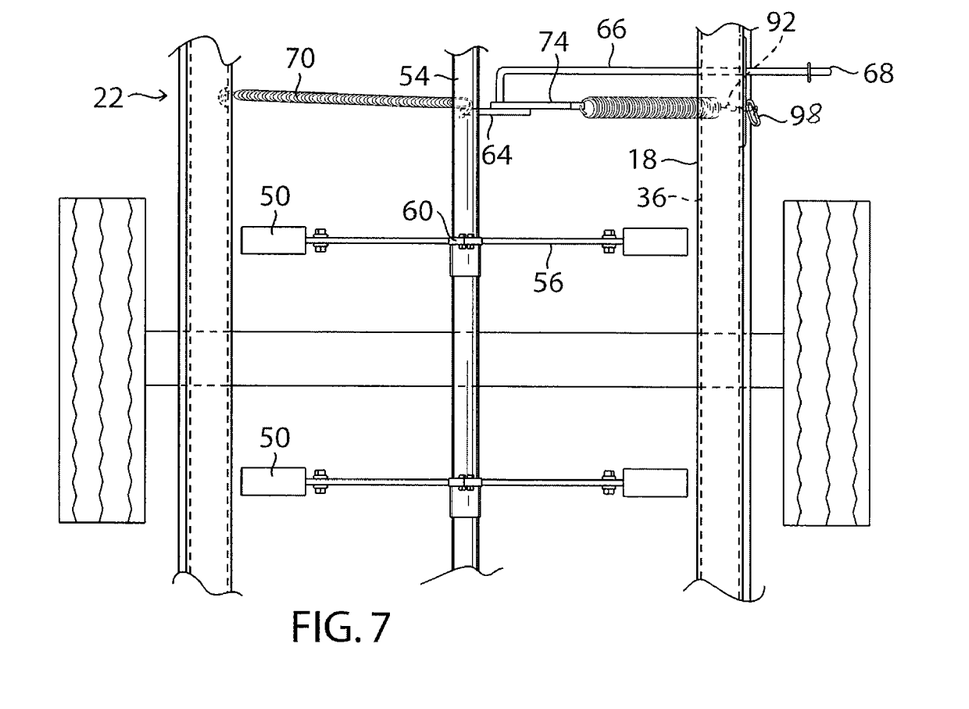
FIG. 7 is a plan view of the tandem assembly of FIG. 5 shown in the disengaged position.
Figure 8:
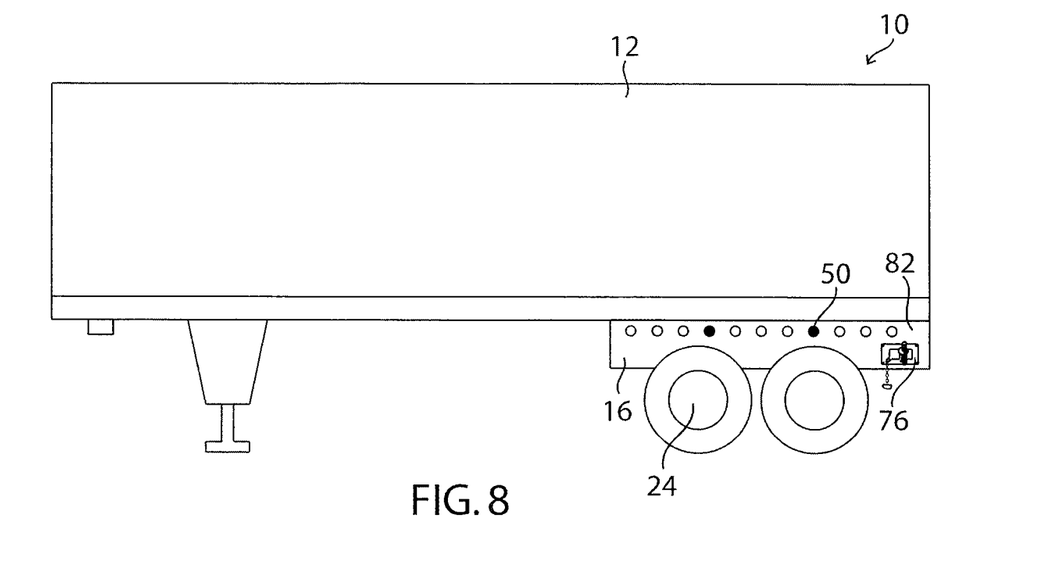
FIG. 8 is a side elevational view of the trailer connected to the tandem illustrating a linkage member and a plate member of the tandem assembly.

A retractable pin assembly generally indicated at 48 (FIG. 2), carried by the tandem assembly 14, includes a plurality of pins 50 provided for locking the sub-frame 22 to the frame members 18 in various positions of adjustment relative thereto. In the illustrated embodiment as shown in FIGS. 6 & 7, four pins 50 are provided, with two pins 50 disposed at the front of the subframe 22 and two pins 50 disposed at the rear of the sub-frame 22 opposite the frame members 18.

Returning to FIGS. 2 and 3, two rear pins 50 are shown. The pins 50 mount for linear horizontal movement in a direction transverse to the chassis 16 (FIG. 1) and are retractable so as to permit adjustment of the slide members 36 of the sub-frame 22 to various positions of adjustment relative to the frame members 18. The pins 50 may be extended for locking the sub-frame 22 and thus the tandem assembly 14 in a selected position of adjustment to compensate for a particular loading of the chassis 16. As shown in FIG. 2, when a pin 50 is in its extended position, the pin 50 extends into an opening of the side wall of one of the slide members 36 and then through one of the series of longitudinally spaced trailer openings 20 in the associated frame member 18.

The retractable pin assembly 48 also includes a linkage mechanism, generally indicated at 52 (FIG. 2), carried by the sub-frame 22 of the tandem assembly 14. The linkage mechanism 52 is constructed and moves between an engaged position (FIGS. 2, 4 and 6) and a disengaged position (FIGS. 3, 5 and 7). The linkage mechanism 52 includes a shaft 54 extending longitudinally of the sub-frame 22 and generally parallel to the slide members 36 and midway therebetween. A linkage arm 56 couples to each locking pin 50 via a connector 58. End of each linkage arm 56 couples to a cam 60. The cam 60, in turn, couples to the shaft 54 at both the front and rear of the subframe 22.

Referring to FIGS. 2 and 3, an actuating assembly generally indicated at 62, is provided to move the linkage mechanism 52 between its engaged and disengaged positions. In the illustrated embodiment, the actuating assembly 62 includes an actuating arm 64 coupled at the rearward end of the shaft 54. The actuating assembly 62 also includes a pull rod 66 coupled to the actuating arm 64. The pull rod 66 includes a handle 68 positioned beyond the frame member 18. Accordingly, portions of the pull rod 66 extend through the selected trailer opening 20. The actuating assembly 62 further includes a return spring 70 connected to the actuating arm 64.

When it is desired to move the tandem assembly 14 with respect to the chassis 16 so as to accommodate a different load of the trailer 10, the operator grasps the handle 68 of the pull rod 66 and pulls the pull rod 66 away from the tandem assembly 14. The actuating arm 64 is pulled outwardly from its engaged position against the bias of the return spring 70 to its disengaged position. In response, the shaft 54 and cam 60 rotate to move the linkage arm 56 and associated pin 50. During this movement, the pins 50 retract out of the trailer openings 20. Accordingly, the tandem assembly 14 is free to move with respect to the chassis 16.

Referring to FIGS. 4-9, a disengagement assembly, generally shown as 72, of the present disclosure comprises a pull member 74, a plate member 76, a linkage member 78 and a bias member 80. The components of the disengagement assembly 72 comprise weather resistant materials to withstand corrosion effects created by water, grit and other road way environmental conditions. In one embodiment, the components of the disengagement assembly 72 are zinc plated. The disengagement assembly 72 operates with the actuating arm 64 of the retractable pin assembly 48 when the actuating arm 64 reciprocates between the engaged position and the disengaged position by force applied by the disengagement assembly 72. The disengagement assembly 72 maintains an applied force on the actuating arm 64 in the disengaged position so that the pins 50 remain disengaged and the tandem assembly 14 remains in a movable relationship with respect to frame members 18 of the trailer 10.

Figure 4:
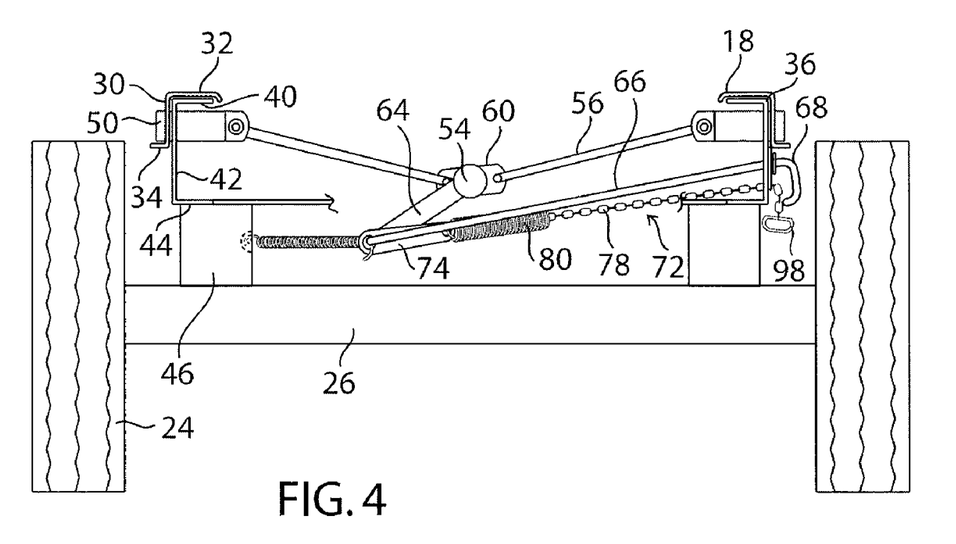
FIG. 4 is a side elevational view of a tandem assembly constructed in accordance with and embodying the present disclosure wherein the tandem assembly is shown connected to the tandem of FIG. 2 in an engaged position.
Figure 5:
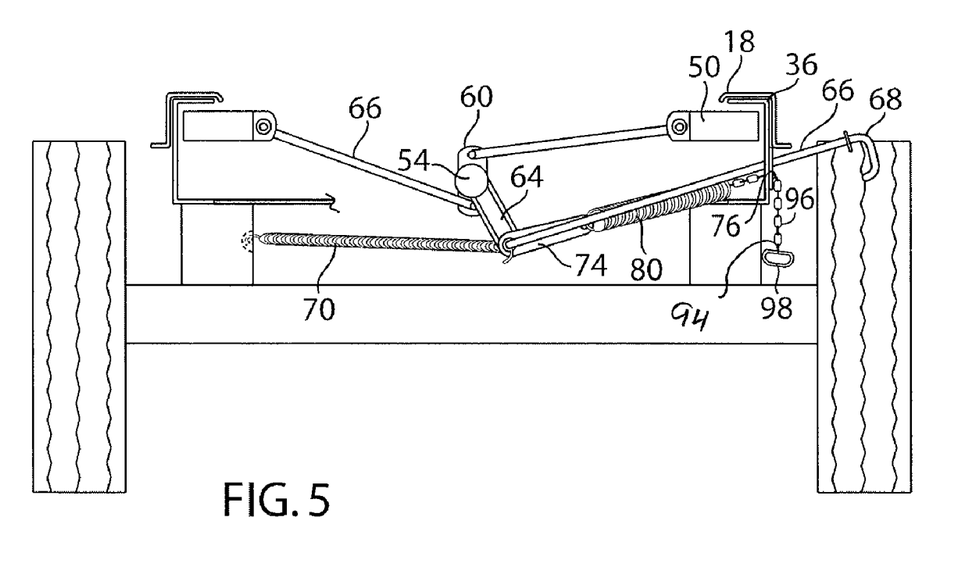
FIG. 5 is a side elevational view of the tandem assembly of FIG. 4 shown in a disengaged position.

As shown in FIG. 4, the pull member 74 removably attaches to a lower end of the actuating arm 64 of the retractable pin assembly 48. The pull member 74 attaches to the actuating arm 64 at or near the same position where the pull rod 66 attaches with the actuating arm 64. In this embodiment, the lower end of the pull rod 66 may pass through an opening of the pull member 74. In another embodiment (FIGS. 10-12), the pull member 74 and the pull rod 66 are connected together as will be discussed.

Figure 9:
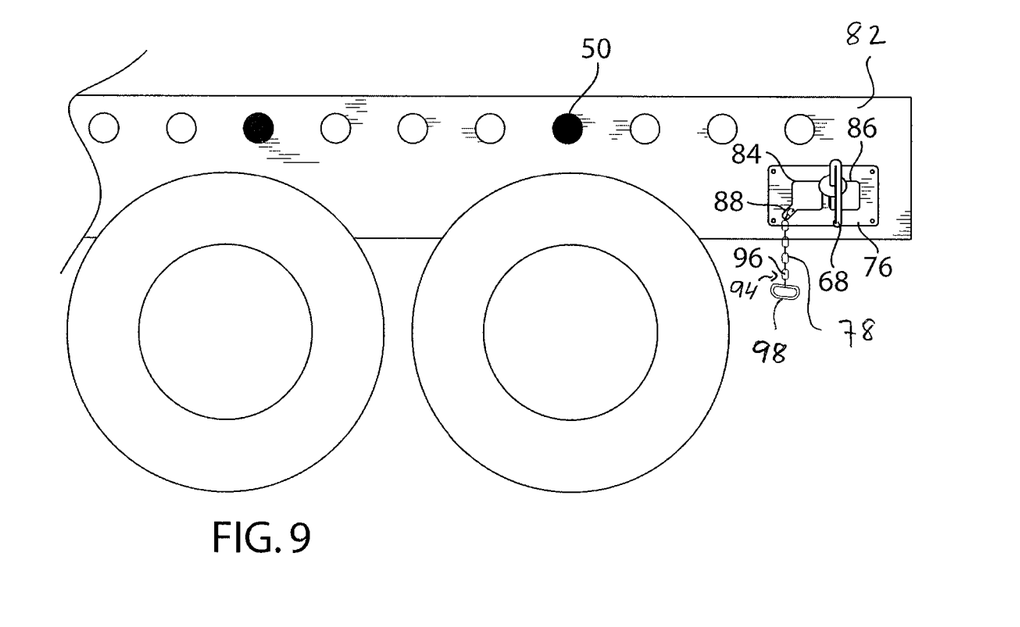
FIG. 9 is partial side view of FIG. 8 illustrating the linkage member of the present disclosure connected to the plate member.

The plate member 76 attaches to an outside surface 82 (FIG. 8) of one of the vertical portions 30 of the frame members 18. The plate member 76 may be removably attached (i.e. bolted) to the outside surface 82 of the frame member 18. Alternatively, the plate member 76 may be permanently attached (i.e. welded) to the outside surface 82 of the frame member 18. Referring to FIG. 9, the plate member 76 comprises a first plate opening 84 and a second plate opening 86 defined therethrough. The first plate opening 84 and the second plate opening 86 respectfully aligned with a tandem opening (not shown) that is defined through one of the slide members 36. The first plate opening 84 accepts the linkage member 78 while the second plate opening 86 accepts a portion of the pull rod 66. The first plate opening 84 has a first notch 88 that engages the linkage member 78 as will be discussed.

As shown in FIG. 9, the opening 84 and the second plate opening 86 are spaced apart within the plate member 76 such that the linkage member 78 and the pull rod 66 are free from contacting each other. In one embodiment, the first plate opening 84 and the second plate opening 86 have a square configuration wherein the notch 88 is positioned at a lower corner edge of the square configuration. Still further, in an embodiment, the first plate opening 84 and the second plate opening 86 may be integrated within the outside surface 82 of the frame member 18. Accordingly, in this embodiment, the plate member 76 comprises a portion of the outside surface 82. In other words, the first plate opening and the second plate opening 86 are cut out of the frame member 18. The plate member 76 may also have a single plate opening (not shown) with the first notch 88 positioned therein.

As shown in FIGS. 6 and 7, the linkage member 78 has a first end 92 and a second end 94. The first end 92 connects with the bias member 80 while the second end 94 adjustably connects to the first notch 88 of the plate member 76. The bias member 80 connects with an upper end of the pull member 74 to connect together the pull member 74 and the linkage member 78. Accordingly, the first end 92 of the linkage member 78 is operatively connected to the pull member 74 via the bias member 80.

The linkage member 78 includes flexible segmented portions 96 wherein the segmented portions 96 are sized and configured to pass through the first plate opening 84 and adjustably engage notch 88 (FIGS. 4, 5 and 9). In one embodiment, the linkage member 78 comprises a chain having chain links as the flexible segmented portions 96. Additionally, in an embodiment, the bias member 80 comprises a spring having a larger spring constant than the return spring 70 of the retractable pin assembly 48.

During assembly of the disengagement assembly 72 to the tandem assembly 14, the operator pushes a portion of the linkage member 78 through the first plate opening 84. The operator then engages one of the segmented portions 96 with the first notch 88 so that the handle 98 of the linkage member 78 suspends from the first plate opening 84. The operator then connects the bias member 80 to the upper end of the pull member 74 and connects the bias member 80 to the linkage member 78. When assembled, the pull member 74, linkage member 78 and bias member 80 do not contact and/or attach to any components of the trailer 10 such as the frame members 18.

During operation, pins 50 engage the selected trailer opening 20 of the frame member 18 to connect the tandem assembly 14 to the trailer 10 (FIG. 4). The return spring 70 biases the lower end of the actuating arm 64 outwardly toward the return spring 70 to maintain a force on the actuating arm 64. This force on the actuating arm 64 is transferred to the pins 50 via the linkage arms 56 of the retractable pin assembly 48.

As shown in FIG. 4, the linkage member 78 suspends from the bias member 80 to the first notch 88 of the first plate opening 84. One of the segmented portions 96 of the linkage member 78 near the handle 98 engages the first notch 88 of the first plate opening 84. In this position, the bias member 80 does not apply any bias force to the actuating arm 64 or linkage member 78.

Referring to FIGS. 5 and 7, when it is desired to move the tandem assembly 14 with respect to the chassis 16 so as to accommodate a different load of the trailer 10, the operator grasps the handle 98 of assembly 72 and pulls the handle 98 outward with respect to the tandem assembly 14. The actuating arm 64 is pulled outwardly from its engaged position against the bias of the return spring 70 to its disengaged position. In particular, bias member 80 forces the pull member 74 toward the plate member 76. In response, the shaft 54 and cam 60 rotate to move the linkage arm 56 and associated pin 50. During this movement of the shaft 54 and cam 60, the pins 50 retract out of the trailer openings 20.

The operator grasps the handle 98 of the linkage member 78 and pulls segmented portions 96 of the linkage member 78 through the first plate opening 84. In response, the bias member 80 extends and pulls the pull member 74. Since the pull member 74 attaches to the actuating arm 64, the actuating arm 64 rotates toward the plate member 76. In response, the return spring 70 extends as the actuator arm 64 rotates. Further, since linkage member 78 connects to the actuating arm 64, the operator only pulls the handle 98 to disengage the pin 50.

With the bias member 80 extended, the operator selectively engages one of the segmented portions 96 of the linkage member 78 with the first notch 88 of the first plate opening 84. As shown in FIG. 5, the pulled segmented portions 96 and handle 98 suspend from the first notch 88. The bias member 80 maintains the bias force applied to the actuating arm 64 via the pull member 74 to keep the pins 50 disengaged from the trailer openings 20. Since the spring constant of the bias member 80 is larger than the spring constant of the return spring 70, the return spring 70 does not move the actuating arm 64 to engage the pins 50 with the trailer openings 20. Accordingly, the adjustable connections of the engaged second end 94 of the linkage member 78 pulls the pull member 74 to maintain the force applied to the actuating arm 64.

The trailer 10 may then be moved forwardly or rearwardly to align with desired trailer openings 20 in the frame members 18 to distribute the load within the chassis 16 uniformly. Thereafter, the segmented portion 96 of the linkage member 78 is released from the notch 88. Upon release of the segmented portions 96 from the notch 88, the return spring 70 biases the actuating arm 64 to engage the pins 50 with selected trailer openings 20. Thus, when the linkage mechanism 52 is in an operative position, the pins 50 lock with the trailer openings 20. As a result, the sub-frame 22 and thus the tandem assembly 14 are retained in a selected position of longitudinal adjustment with respect to the chassis 16. As the disengagement assembly 72 disengages the pins 50 and the actuating assembly 62 engages the pins 50, the operator only need to use the pull rod 66 to assist the return spring 70 of the actuating assembly 62 in re-engaging the pins 50. In other words, the disengagement assembly 72 may eliminate any use of the pull rod 66 to disengage pins 50.

Since the pull member 74 connects with the actuating arm 64 and the linkage member 78 attaches to the plate member 76, the disengagement assembly 72 can remain attached to the tandem assembly 14 at all times such as when the operator drives the trailer 10 over the roadways. Consequently, once the disengagement assembly 72 is set up on the tandem assembly 14, the operator does not have to repeatedly assemble and disassemble the disengagement assembly 72 during each load adjustment. Additionally, since the disengagement assembly 72 does not contact the cargo container 12, the operator can easily and separately move the tandem assembly 14 along any distance from the trailer 10.

During loading/unloading of the trailer, operators prefer having the wheels 24 in the back-most position with respect to the trailer to provide stability and safety. This is especially true when loading heavy cargo, which may otherwise cause the trailer 10 to "see-saw" over the tandem assembly 14 when heavy loads are added. In contrast, when the trailer 10 is on the road, it is necessary to have the wheels 24 moved more toward the front of the trailer 10 in order to distribute the load evenly across the axles 26. The exact position desired will depend on the weight and distribution of the load being carried. The disengagement assembly 72 of the present disclosure allows the trailer operator to conveniently change the position of tandem trailer axles 26 to a known, desired new position in order to vary the weight distribution on the axles while the operator remains in the cab.

Figure 10:
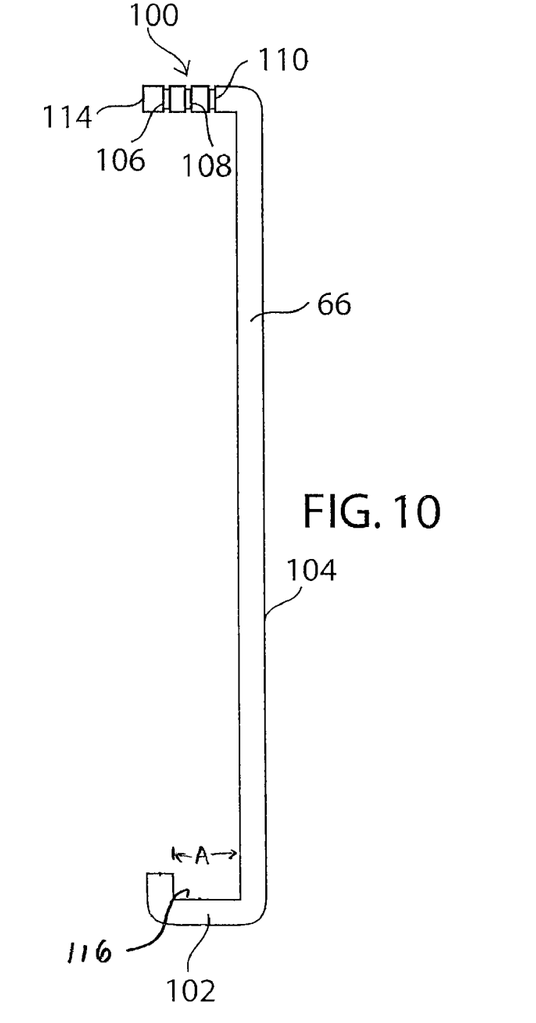
FIG. 10 is a plan view of a pull rod of the disengagement assembly constructed in accordance with and embodying the present disclosure.
Figure 11:
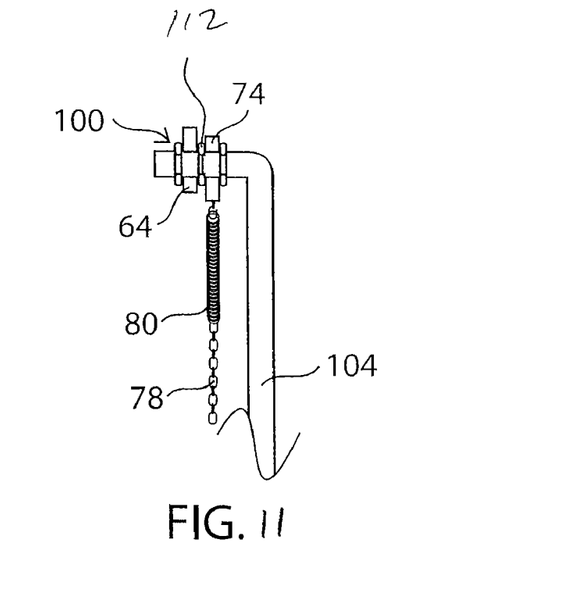
FIG. 11 is a partial plan view of the pull rod of FIG. 10 engaged with the retractable pin assembly and linkage member of the tandem assembly.
Figure 12:
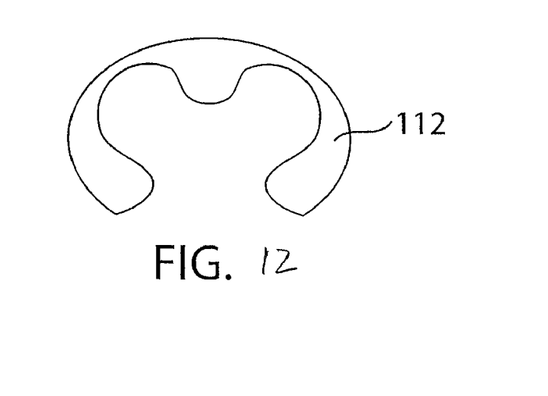
FIG. 12 is a plan view of a clamp that connects the pull rod to the retractable pin assembly and the tandem assembly.

Turning to FIGS. 10-12, with respect to the pull rod 66, the pull member 74, in one embodiment, connects with pull rod 66. In this embodiment, the pull rod 66 includes an engagement end 100, a handling end 102 and a body 104 disposed therebetween (FIG. 10). The pull rod 66 of the present disclosure minimizes physical stress experienced by the operator when the operator uses the pull rod 66 as will be discussed.

The engagement end 100 includes three grooves 106, 108 and 110 that are sized and shaped to accept clamps 112. As shown in FIG. 11, clamp 112 may comprise an "E-clamp" configuration. In one embodiment, the first groove 106 is positioned about a ¼ inch as measured from end 114 of the engagement end 100; the second groove 108 is positioned about a ½ inch as measured from end 114 and the third groove is positioned about 1 inch as measured from end 114.

Referring to FIG. 12, the engagement end 100 passes through the actuating arm 64 of the actuating assembly 62 and passes through the pull member 74 of the disengagement assembly 72. The engagement end 100 positions the actuating arm 64 between the first groove 106 and the second groove 108 and positions the pull member 74 between the second groove 108 and the third groove 110. Clamps 112 insert within grooves 106, 108 and 110 to connect the engagement end 100 to the actuating arm 64 and the pull member 74. Besides clamp 112, other retaining means such as cotter pins, welds or washers may connect the actuating arm 64 with the pull rod 66.

Returning to FIG. 10, the handling end 102 comprises a grip portion 116. The length of the grip portion 116 is sized and shaped such that the operator preferably uses two fingers to grasp the grip portion 116. Currently, grip portions of existing pull rods allow the operator to firmly grasp the handle with all fingers of one hand. Consequently, the operator with all four fingers exerts a greater pulling action on the pull rod leading to shoulder and back injuries. The length of the grip portion 116 limits the amount of physical exertion used by the operator since the length of the grip portion 116 limits two fingers applied to the handling end 102. The length of the grip portion 116 is denoted as "A" in FIG. 10. In one embodiment, the length denoted "A" of the grip portion 116 is less than four inches. Still further, in an embodiment, the length denoted "A" of the grip portion 116 is between about one inch and about three inches.

In view of the above, it will be seen that the several objects of the disclosure are achieved and other advantageous results are obtained. As various changes could be made in the above constructions without departing from the scope of the disclosure, it is intended that all matter contained in the above description or shown in the accompanying drawings shall be interpreted as illustrative and not in a limiting sense.

The invention claimed is:

1. A disengagement assembly that operates with an actuating arm and a return spring of a retractable pin assembly of a tandem wherein the actuating arm connects with the return spring and reciprocates between an engaged position and a disengaged position by force applied by the disengagement assembly such that the disengagement assembly maintains an applied force on the actuating arm in the disengaged position so that the tandem remains in a movable relationship with respect to frame members of a trailer, the disengagement assembly comprising:
   a pull member connected with the actuating arm of the retractable pin assembly;
   a bias member connected to the pull member;
   a plate member attached to an outside wall of one of the frame members of the trailer, the plate member having a first opening that is aligned with an opening of the outside wall; and
   a linkage member having a first end, a second end, and flexible segmented portions disposed therebetween, the first end being operatively connected to the bias member and the second end being adjustably connected to the first opening of the plate member via one of the flexible segmented portions adjustably connected with the first opening wherein adjustable connections of the bias member and the second end of the linkage member maintains the force applied to the actuating arm in the disengaged position.

2. The disengagement assembly of claim 1 wherein the bias member comprises a spring having a larger coefficient of spring constant than the return spring of the retractable pin assembly.

3. The disengagement assembly of claim 2 wherein the linkage member comprises a chain.

4. The disengagement assembly of claim 2 wherein the first opening of the plate member includes a notch that adjustably connects with one of the flexible segmented portions.

5. The disengagement assembly of claim 1 further comprising a pull rod, the pull rod having an engagement end and a handling end, the engagement end having grooves that position the actuating arm and pull member around the engagement end, the handling end having a grip portion wherein the grip portion has as a length between about one inch and about three inches.

6. The disengagement assembly of claim 5 wherein the plate member has a second opening configured to receive a handle portion of the pull rod.

7. The disengagement assembly of claim 5 wherein the actuating arm connects with the pull rod.

8. The disengagement assembly of claim 1 wherein the plate member is permanently attached to the outside wall of one of the frame members.

9. A disengagement assembly that operates with an actuating arm and a return spring of a retractable pin assembly of a tandem wherein the actuating arm connects with the return spring and reciprocates between an engaged position and a disengaged position by force applied by the disengagement assembly such that the disengagement assembly maintains an applied force on the actuating arm in the disengaged position so that the tandem remains in a movable relationship with respect to frame members of a trailer, the disengagement assembly comprising:
   a pull member connected with the actuating arm of the retractable pin assembly;
   a bias member connected to the pull member;
   a plate member attached to an outside wall of one of the frame members of the trailer, the plate member having a first opening that is aligned with an opening of the outside wall;
   a linkage member having a first end, a second end, and flexible segmented portions disposed therebetween, the first end being operatively connected to the bias member and the second end being adjustably connected to the first opening of the plate member via one of the flexible segmented portions adjustably connected with the notch wherein adjustment of the bias member and the second end within the first opening exerts a force on the actuating arm in the disengaged position; and
   a pull rod connected to the actuating arm at a position where the pull member connects with the actuating arm.

10. The roadway vehicle assembly of claim 9 wherein the first opening of the plate member includes a notch that adjustably connects with a selected flexible segmented portion.

11. A method of maintaining a force applied to an actuator arm of a retractable pin assembly of a tandem so that the tandem remains in a movable relationship with respect to frame members of a trailer chassis, the method comprising:
   connecting a pull member to the actuating arm which is connected to a shaft and connected to a return spring of the retractable pin assembly;
   biasing a linkage member that is attached to the actuating arm;
   applying the force to the actuating arm by pulling the pull member via the linkage member in order to disengage pins that are connected to the actuating arm and that are engaged with the frame members;
   adjustably connecting the pulled linkage member to a plate member that is attached to one of the frame members by inserting a segmented portion of the pulled linkage member into an opening of the plate member wherein adjustably connecting the pulled linkage member maintains the force applied to the actuating arm by the pull member such that the actuating arm maintains the pins in the disengaged; and continuing to bias the pulled linkage member while the pulled linkage member is adjustably connected to the plate member.

12. The method of claim 11 wherein adjustably connecting the pulled linkage member to the plate member comprises inserting a segmented portion of the pulled linkage member into a first notch of the plate member.

13. The method of claim 12 wherein pulling the linkage member comprises pulling a portion of the linkage member through the plate member.

14. The method of claim 13 further comprising disconnecting the pulled linkage member from the first notch and applying a return force to the actuating arm.

* * * * *

UNITED STATES PATENT AND TRADEMARK OFFICE
CERTIFICATE OF CORRECTION

PATENT NO.         : 7,591,336 B2                                    Page 1 of 1
APPLICATION NO. : 11/627226
DATED                : September 22, 2009
INVENTOR(S)       : Paul Hackman

It is certified that error appears in the above-identified patent and that said Letters Patent is hereby corrected as shown below:

Col. 11, Claim 11, Line 5

After the word "disengaged" and before (;)
  Please insert the word -- position --

Signed and Sealed this

First Day of December, 2009

David J. Kappos
*Director of the United States Patent and Trademark Office*